(12) United States Patent
Sapir

(10) Patent No.: US 7,380,459 B1
(45) Date of Patent: Jun. 3, 2008

(54) ABSOLUTE PRESSURE SENSOR

(75) Inventor: Itzhak Sapir, Irvine, CA (US)

(73) Assignee: Irvine Sensors Corp., Costa Mesa, CA (US)

( * ) Notice: Subject to any disclaimer, the term of this patent is extended or adjusted under 35 U.S.C. 154(b) by 0 days.

(21) Appl. No.: 11/654,292

(22) Filed: Jan. 16, 2007

Related U.S. Application Data

(60) Provisional application No. 60/758,922, filed on Jan. 17, 2006.

(51) Int. Cl.
*G01L 11/00* (2006.01)
(52) U.S. Cl. .............................. 73/704; 73/702; 73/703
(58) Field of Classification Search ........... 73/700–756
See application file for complete search history.

(56) References Cited

U.S. PATENT DOCUMENTS

| | | | |
|---|---|---|---|
| 4,600,855 A | 7/1986 | Strachan | |
| 4,748,850 A * | 6/1988 | Kataoka | 73/660 |
| 5,239,864 A * | 8/1993 | von Pragenau | 73/118.1 |
| 6,461,301 B2 | 10/2002 | Smith | |
| 6,626,436 B2 * | 9/2003 | Pecht et al. | 277/317 |
| 7,146,861 B1 | 12/2006 | Cook et al. | |
| 7,149,374 B2 | 12/2006 | Lagakos et al. | |

* cited by examiner

*Primary Examiner*—Andre J. Allen
*Assistant Examiner*—Jermaine Jenkins
(74) *Attorney, Agent, or Firm*—W. Eric Boyd, Esq.

(57) ABSTRACT

An absolute pressure sensor is provided comprising a vibration sensing element such as a piezoelectric element disposed on a vibratable seal. The seal is disposed between two gas spring chambers which are maintained at substantially ambient pressure. The resonant vibration frequency of the seal changes and is proportional with the pressure in the gas spring chambers such that the electrical output of the piezoelectric element will be proportional to the vibration frequency. The frequency of the output of the piezoelectric element is read using suitable electronic circuitry and compared to a set of predetermined pressure/frequency data for calculation of a pressure value.

9 Claims, 2 Drawing Sheets

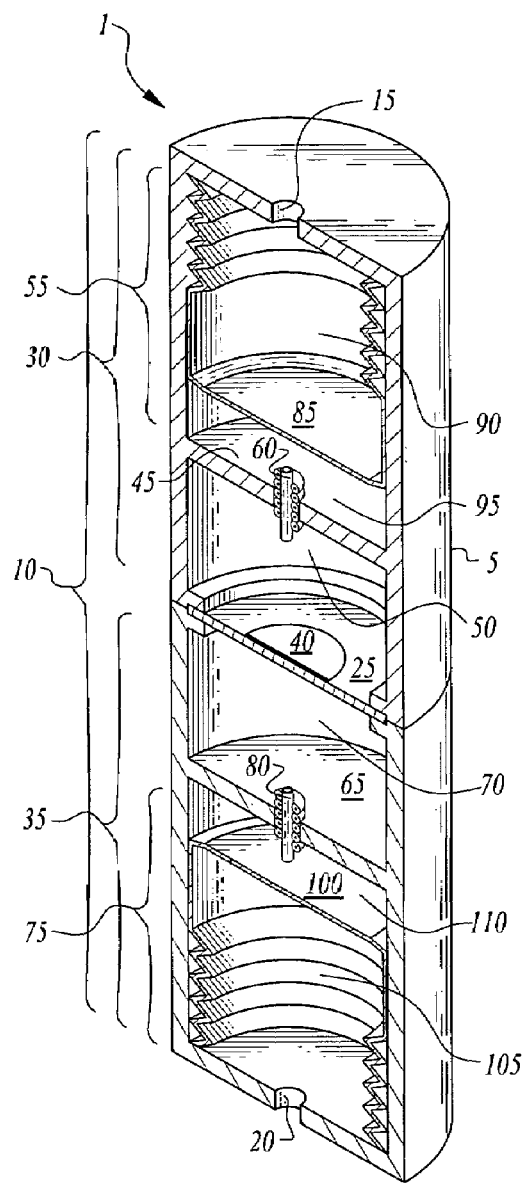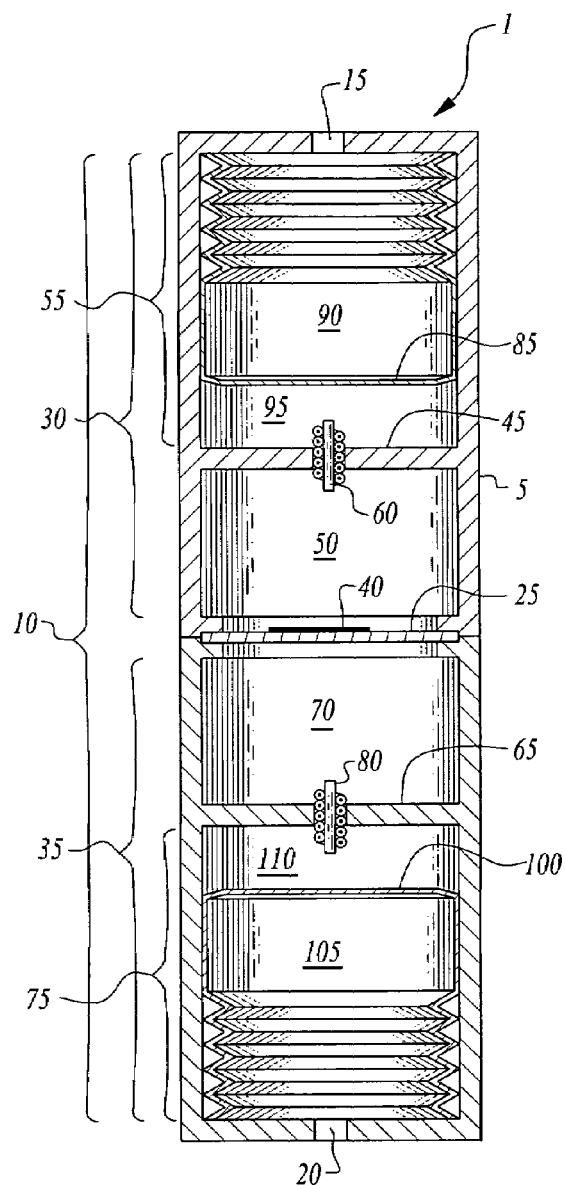
Fig. 1
Fig. 2

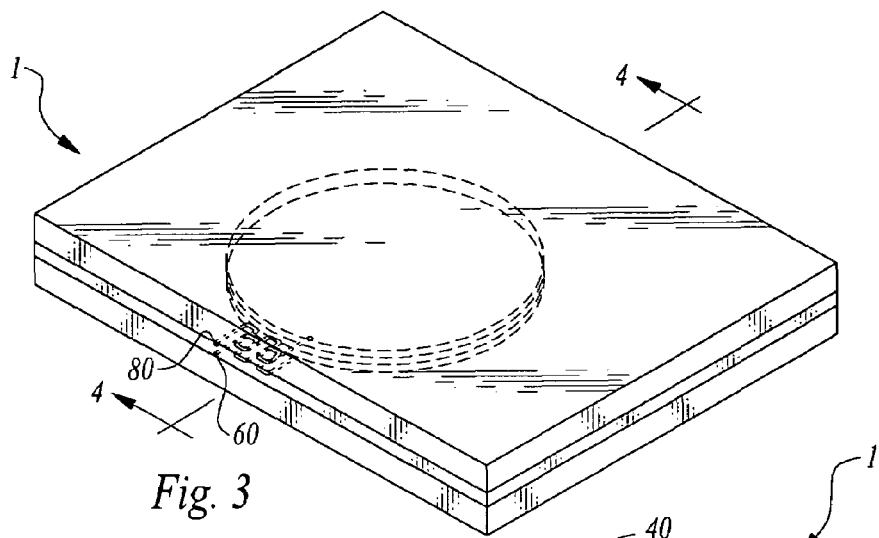
Fig. 3
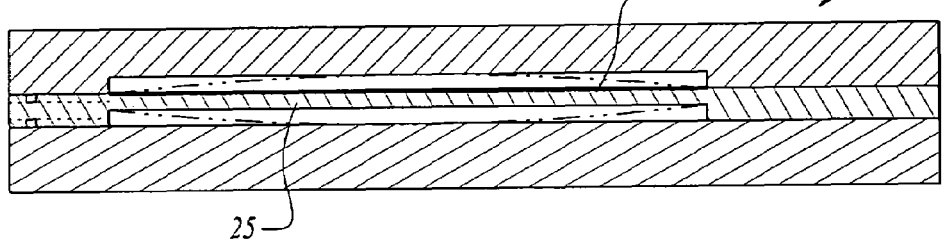
Fig. 4
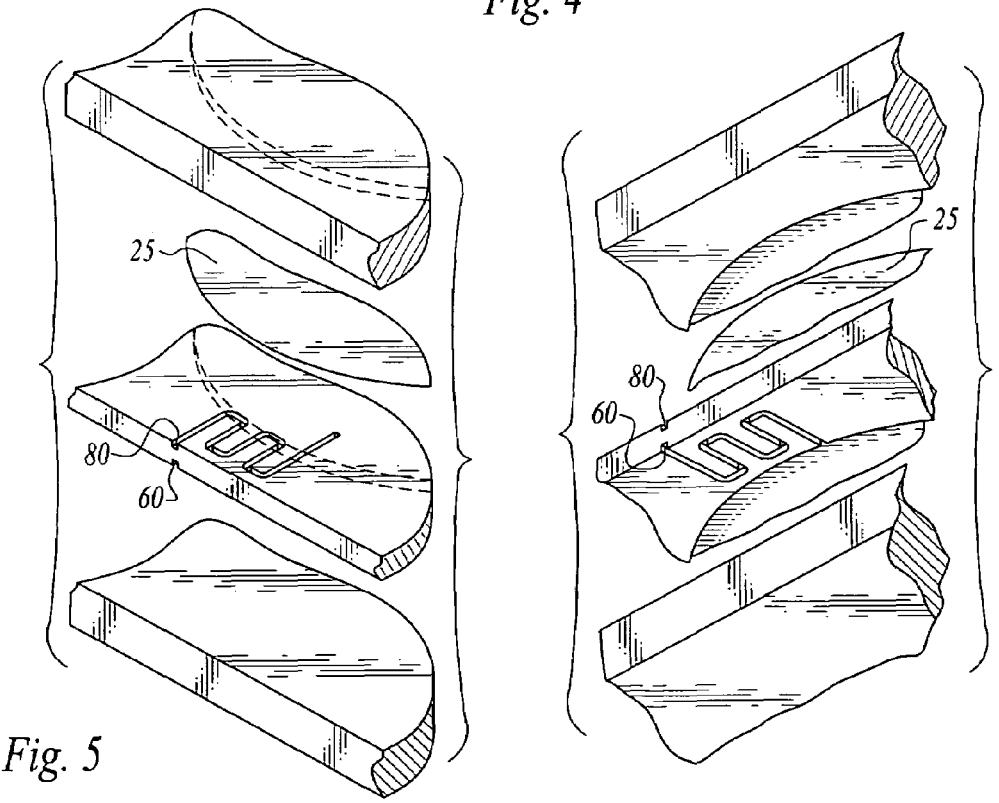
Fig. 5
Fig. 6

ABSOLUTE PRESSURE SENSOR

CROSS-REFERENCE TO RELATED APPLICATIONS

This application claims the benefit of U.S. Provisional Patent Application 60/758,922, filed on Jan. 17, 2006, entitled "Absolute Pressure Sensor" pursuant to 35 USC 119, which provisional application is incorporated fully herein by reference.

STATEMENT REGARDING FEDERALLY SPONSORED RESEARCH AND DEVELOPMENT

Not applicable.

DESCRIPTION

1. Background of the Invention

The invention relates generally to pressure sensing devices. More specifically, the invention relates to a device and method for accurately measuring a pressure in a gas or fluid using the resonant frequency of a vibration sensing element disposed between two gas spring volumes.

Prior art absolute pressure sensors typically function by measuring an ambient pressure relative to a known reference pressure in a sealed vessel or compartment. The measurement is performed by sensing the combined effect of the two relative pressures on a sensing element such as a strain gauge. In order for this type of sensor to produce accurate, absolute pressure readings, the reference pressure must be known at the time the measurement is taken and the behavior of the sensing element must remain constant.

There are several known methods for pressure sensing in prior art sensors. A common method is strain detection on the surface of a membrane with the ambient pressure on one side of the membrane and a sealed reference compartment or vessel with the reference pressure on the other side.

Several failure modes can cause this type of sensor to go out of calibration. A first failure mode is drift in the reference pressure in either a predicted manner, such as temperature change, or in an unpredicted manner, such as pressure leakage in the reference vessel.

A second failure mode relates to changes over time in the electrical characteristics of the sensing element or elements, i.e., a strain gauge or a set of strain gauges. While it is possible to mitigate the effect of temperature-induced reference pressure drift by sensing the temperature and calculating the reference pressure change, the leakage failure mechanism and failures attributable to changes in electrical characteristics of the sensing elements are more difficult to overcome.

The most common method for verifying the accuracy of the above prior art sensor devices is manual calibration. In this procedure, a known pressure level is applied to the sensor and the measurement reading compared to an expected value. If the sensor output is out of its specified range, an adjustment to the readout signal is made and the sensor is calibrated. In practice, such calibration procedures are cumbersome and require costly personnel.

The proposed invention overcomes the above maintenance and accuracy limitations of prior art devices by measuring different physical phenomenon for absolute pressure measurement.

The invention takes advantage of two physical properties, 1) the direct relationship between the resonant frequency and the spring constant in a mass-spring mechanical system, and, 2) the fact that when the spring in a spring-mass system is a gas spring, its spring constant is proportional to the pressure in its chamber (i.e., the spring constant increases when the pressure increases).

The governing equation for the above mass/spring system is $f_{res} = [\sqrt{(k/m)}]/2\pi$ where k is the spring constant and m is the vibrating mass.

2. Brief Summary of the Invention

In a first aspect of the invention, the first-mode resonant frequency is read from an oscillating membrane (also referred to as a seal herein) having a vibration sensing element in a varying pressure environment. The resonant frequency output of the seal is used to calculate the pressure. The sensor consists of a seal having a vibration sensing element such as a piezoelectric element mounted thereon that separates two gas spring chambers with embedded mechanisms in both chambers to allow the gas spring pressure to continuously equalize to the ambient pressure. This mechanism allows pressure equalization to the ambient environment while still ensuring the chambers behave like sealed gas springs.

In a second aspect of the invention, one or more of the elements of the proposed device may be fabricated from suitable MEMS (micro-electro-mechanical systems) processes are as known in the MEMS arts.

In a third aspect of the invention, one or more sensors measure the ambient pressure while mounted on a vibrating platform such as the rotating blades of a helicopter rotor, and are continuously exposed to broad spectrum random vibration. This input vibration continuously excites the sensor's seal which keeps vibrating at its resonant frequency. The vibration frequency is read and analyzed. The gas-spring behavior is achieved when the vibrating seal alternately compresses the gas in the two chambers in a piston-like action that makes the seal's vibration frequency pressure-dependent as mentioned above. The frequency reading is compared to predetermined calibration data (e.g., several pressure-frequency sets) taken at the time of the sensor's assembly, to allow the calculation of the instant ambient pressure.

While the claimed apparatus and method herein has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

BRIEF DESCRIPTION OF THE DRAWINGS

FIG. 1 is an isometric cross-sectional view of a preferred embodiment of the pressure sensor of the invention.

FIG. 2 is a cross-sectional view of a preferred embodiment of the pressure sensor of the invention.

FIG. 3 is an isometric view of an alternative MEMS embodiment of the pressure sensor of the invention.

FIG. 4 is a cross sectional view of FIG. 3.

FIGS. 5 and 6 reflect separate layers of the MEMS pressure sensor of FIG. 3.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENT

Turning now to the figures wherein like numerals identify like elements among the several views, FIG. 1 shows a preferred embodiment of the pressure sensor 1 of the invention.

Pressure sensor 1 is comprised of a housing 5 defining an interior volume 10. Housing 5 is further comprised of a first ambient pressure inlet port 15 and a second ambient pressure inlet port 20, both of which are in fluid communication with and function to admit ambient pressure to interior volume 10 of housing 5 as further discussed below.

A sealing member 25 is sealably disposed so as to provide a substantially air-tight seal between the partitioned sections of interior volume 10. The disposition of sealing member 25 within interior volume 25 defines a first major chamber 30 and second major chamber 35, each of which is preferably substantially equal in geometry and volume.

Sealing member 25 is preferably a flexible membrane capable of oscillating or vibrating in response to a mechanical vibration applied to its surface. Sealing member 25 and affixed vibration sensing element 40 are fixedly and sealably attached to the interior surface of housing 5 so as to separate the two chambers and avoid any direct gas transfer between the two. Sealing member 25 is preferably designed so its own rigidity in the direction perpendicular to its major surface is minimized.

A vibration sensing element 40, preferably a piezoelectric element, is affixed or disposed upon sealing member 25 whereby mechanical vibration of vibration sensing element 40 is mechanically transferred to sealing member 25. In the piezoelectric element embodiment, his may be accomplished for example, by electrically exciting the piezoelectric element with a predetermined voltage to induce a vibration in the piezoelectric element, which vibration is mechanically transferred to sealing member 25. Suitable piezoelectric elements include piezoelectric transducer elements and piezo-bending disc actuators as are available from Piezo Systems, Inc.

First major chamber 30 is comprised of a first pressure equalization seal 45.

First pressurization seal 45 defines a first gas spring chamber 50 and a first external chamber 55 within first major chamber 30. A first pressure equalization port 60 is provided through first pressure equalization seal 45 and allows fluid communication between first gas spring chamber 50 and first external chamber 55.

In like manner, second major chamber 35 is comprised of a second pressure equalization seal 65.

Second pressure equalization seal 65 defines a second gas spring chamber 70 and a second external chamber 75 within second major chamber 35. A second pressure equalization port 80 is provided through second pressure equalization seal 65 and allows fluid communication between second gas spring chamber 70 and second external chamber 75.

Thus, the proposed invention generally comprises two gas spring chambers filled with a gas (e.g., nitrogen, argon, dry air or the like) and a mechanism for equalizing the chambers' pressure to the ambient pressure without any actual gas exchange.

First external chamber 55 is comprised of a first diaphragm seal 85 so as to define a first ambient chamber 90 and a first isolation chamber 95: First ambient chamber 90 is in fluid communication with first inlet port 15.

Again in like manner, second external chamber 75 is comprised of a second diaphragm seal 100 so as to define a second ambient chamber 105 and a second isolation chamber 110. Second ambient chamber 105 is in fluid communication with second inlet port 20.

In this embodiment, each of the respective diaphragm seals is sealably affixed so as to create a seal between the respective ambient chambers and isolation chambers. Alternative embodiments do not require the diaphragm seal or seals. Diaphragm seals 85 and 100 are preferably a bellows-like configuration or a suitable movable or flexible diaphragm material or any suitable means whereby the volume of the ambient chambers is capable of varying in response to a variance in an external pressure communicated to the inlet ports.

As reflecting in FIGS. 1 and 2, the pressure equalization mechanism comprises dual diaphragm seals disposed within two external chambers function to protect the gas spring chamber interiors from the environment. The diaphragms move in and out within the first and second external chambers to change the relative volumes of the isolation and ambient chambers until the internal and ambient pressures are equalized. The isolation chambers are in fluid communication with the gas spring chambers via a small inner diameter tube or port of a predetermined length and shape. These ports act as "low pass filters" for pressure fluctuations between the isolation and gas spring chambers.

When pressure sensor 1 is exposed to an ambient pressure, the ambient pressure is transferred through first and second inlet ports 15 and 20 and into first and second ambient chambers 90 and 105. As a result of exposure to ambient pressure, first and second diagram seals 85 and 100 will expand or contract, depending upon the pressure differential between the respective external chambers and isolation chambers. The expansion or contraction of diaphragm seals results in a proportional compression or expansion of the gas within the respective gas spring chambers, which compression or expansion is passed through the respective pressure equalization ports, so as to expose sealing member 25 to substantially equal pressures on both of its major surfaces, the pressures being proportional to those of the ambient pressure environment.

When pressure measurements are not being taken, a change in the ambient pressure causes the diaphragms to move and the pressure in the gas spring chambers to adjust continuously. At the same time, the pressure between the isolation and gas spring chambers is equalized through the ports.

During the time a pressure measurement is taken, higher frequency pressure waves generated by the vibrating seal inside the chambers attempt to travel through the ports and to the isolation and gas spring chambers. When the ports' inner diameter, length and shape are designed properly, the ports will behave as closed valves to the relatively high frequency waves and will not permit the isolation chambers to participate in the spring effect.

In an alternative preferred embodiment illustrated in FIGS. 3-6, the pressure sensor of the invention may be fabricated using MEMS (micro-electrical-mechanical systems) processes as are known to those skilled in the MEMS arts.

As reflected in FIGS. 3-6, the MEMS embodiment is comprised of two or more layers of MEMS processed material, such as a silicon or polysilicon material, which layers are bonded together to provide the pressure sensor assembly.

Sealing member 25 has vibration sensing element 40 affixed to one or both of its major surfaces. Sealing member 25 with vibration sensing element 40 thereon is vibrateably disposed between first gas spring chamber 50 and second gas spring chamber 70. Each of first gas spring chamber 50 and second gas spring 70 are in communication with the ambient pressure via respective first pressure equalization port 60 and second pressure equalization port 80, which geometries can be designed or "tuned" to provide the desired response to act as a low pass filter.

In the MEMS embodiment, small diameter serpentine channels preferably define the respective ports 60 and 80 and are used to connect the gas spring chambers 50 and 70 to the ambient pressure environment, acting as a pressure low pass type filter. Low frequency pressure changes are transferred through the ports to equalize the gas spring chamber pressures to the ambient pressure. Higher frequency pressure waves caused by the sealing member vibration do not pass through the tuned ports and the chambers then behave as sealed chambers. Note that in this embodiment, diaphragm seals are not incorporated and that the gas spring chambers are in communication with the ambient pressure.

As can be envisioned, a higher pressure in the respective gas spring chambers will provide a higher resistance to mechanical oscillation of sealing member 25, which in turn will affect the resonant oscillating frequency of sealing member 25. That is, the higher the pressure inside the gas spring chambers, the higher the gas spring constant and thus the higher the vibration frequency of the sealing member.

During operation, a pressure measurement is taken by sending a short electric excitation pulse to the vibration sensing element, generating a mechanical vibration. The mechanical vibration of the vibration sensing element, which is affixed to the sealing member, generates a vibration to the sealing member in a direction perpendicular to the sealing member surface.

As the sealing member vibrates, it behaves like a mass in a mass/spring system against the two compressed gas spring chambers, causing the gas in both chambers to compress and decompress. The mass may be the combined sealing member/vibration sensing element mass or a concentrated mass affixed to the sealing member.

Immediately following the excitation, the voltage pulses generated by the vibration sensing element are read and analyzed by suitable electronic circuitry. As noted above, the higher the pressure inside the chambers, the higher the spring constant thus the higher the vibration frequency. The signals read from the vibration sensing element are converted to an electronic frequency figure that represents the first mode resonant frequency of the spring/mass system.

Similar to a system incorporating a metal spring, there is a damping factor in the system and the vibration amplitude decays throughout the duration of the measurement but equations for simple harmonic motion of a damped mass-spring system show that there will be no change in frequency.

During sensor fabrication and assembly, an initial calibration step is preferably carried out and a curve for frequency vs. pressure generated, based upon the physical response of the individual sensor. The measured frequency is compared to the generated curve and the absolute pressure obtained. Since the pressure in all parts of the sensor remains equal, there is no mechanism (pressure differential relative to a reference pressure vessel) that can cause leakage. When a measurement is taken, the pressure inside the chambers remains constant, regardless of the physical cause and is equal to the ambient pressure. This makes the proposed sensor relatively immune to the two main failure modes of conventional absolute pressure sensors.

The above described system is a pure frequency based absolute pressure sensor. Hybrid systems are within the scope of the invention where a conventional sensor such as strain detection on a membrane is used to detect the ambient-to-reference pressure difference and a frequency based sensor is used to determine the absolute value of the inner reference pressure.

When mounted on a vibrating platform such as the rotor blade of a helicopter, the sensor's seal is excited by the helicopter's broad spectrum random vibration. In this embodiment, the resonant frequency of the sensor should be designed to be higher than the highest frequency of significant energy of the helicopter's vibration. This will ensure that the seal will vibrate at its resonant frequency and not at the input frequency. The input vibration causes the seal to vibrate at its resonant frequency in a direction perpendicular to its major surface.

When the seal vibrates, it acts as a piston against two compressed gas springs, causing the gas in both chambers to alternately compress. This motion is equivalent to a mass-spring mechanical system with the mass being the piezoelectric element mass or a real concentrated mass mounted on the center of the element.

Frequency counting electronic circuitry is desirably used with the sensor of the invention to determine the frequency of the output of the seal/vibration sensing element assembly. Known frequency counters use a digital counting technique to determine the frequency of an electronic signal, generally comprising accurate clock signal source, a gate circuit and a digital counter. A number of implementations are possible, including direct digital counters, phase locked frequency counters and heterodyne frequency counters.

For cases where the frequency being measured is relatively slow (e.g., sub-megahertz) direct digital counting is the simplest means of measurement. This can be accomplished using a zero-crossing detector and a counting circuit that measures the time between pulses as is known to those skilled in the electronic arts.

A beneficial attribute of the pressure sensor of the invention is that there is no pressure differential between any two points at any time. This attribute eliminates failure modes due to leakage or structural failure of the reference pressure vessel as found in prior art methods. Because the pressure sensing method involves frequency measurement rather than resistance, capacitance or other forms of strain sensing, the proposed invention is much less prone to commonly known failure modes. Further, unlike the "analog" nature of resistance or capacitance readings, frequency sensing has a "digital" nature and thus is not sensitive to changes in the electrical characteristics of the sensing element or to electromagnetic interference and hysteresis. Generally, absent a catastrophic failure (e.g., mechanical breakage or delamination), a frequency sensor will repeatedly produce accurate readings.

In the present invention, the waveform output of a healthy sensor at different pressure levels is expected to be a non-clipped sine wave signal, symmetrical to the zero axis. This is due to the symmetrical nature of the sensor's structure in a normal situation. The waveform should also resemble the calibration waveform under the same conditions. A clipped or distorted waveform indicates a failure in the piezoelectric element. An asymmetrical waveform indicates a failure in the pressure equalization mechanism. In general, a waveform differing from the calibration waveform is a sign of a faulty sensor.

By obtaining the waveform directly from signals received from the piezoelectric element, the described health check mechanism is an embedded and inseparable part of the system.

Many alterations and modifications may be made by those having ordinary skill in the art without departing from the spirit and scope of the invention. Therefore, it must be understood that the illustrated embodiment has been set forth only for the purpose of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed even when not initially claimed in such combinations.

The words used in this specification to describe the invention and its various embodiments are to be understood not only in the sense of their commonly defined meanings, but to include by special definition in this specification, structure, material or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims are therefore defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Although elements may be described above as acting in certain combinations and even initially claimed as such, it is to be expressly understood that one or more elements from a claimed combination can, in some cases be excised from the combination and that the claimed combination may be directed to a sub combination or variation of a sub combination.

Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the fundamental idea of the invention.

I claim:

1. An apparatus for determining an ambient pressure comprising:
    a housing comprising two gas spring chambers having a vibrateable seal disposed between them,
    said vibrateable seal having a vibration sensing element for providing an electrical output proportional to a mechanical vibration of said vibrateable seal disposed thereon,
    means for converting said electrical output to a frequency value, and,
    means for comparing said frequency value to a predetermined set of pressure/frequency data.

2. The apparatus of claim 1 where said vibration sensing element is a piezoelectric element.

3. The apparatus of claim 2 further comprising means for electrically exciting said piezoelectric element to induce a mechanical vibration to said vibrateable seal.

4. A method for determining an ambient pressure comprising:
    disposing a vibrateable seal having a vibration sensing element disposed thereon between two gas spring chambers,
    exposing said vibration sensing element to a vibration source whereby said vibrateable seal mechanically oscillates at a resonant mechanical frequency,
    converting said resonant mechanical frequency into an electrical signal having an electrical frequency, and,
    comparing said electrical frequency to a predetermined set of pressure/frequency data to determine an ambient pressure value.

5. The method of claim 4 wherein said vibration sensing element is a piezoelectric element.

6. A method for determining an ambient pressure comprising:
    disposing a vibrateable seal having a vibration sensing element disposed thereon between two gas spring chambers,
    each of said gas spring chambers having a pressure substantially equal to said ambient pressure,
    electrically exciting said vibration sensing element whereby a mechanical vibration is generated and transferred to said vibrateable seal whereby said vibrateable seal mechanically oscillates at a resonant mechanical frequency,
    converting said resonant mechanical frequency into an electrical signal having an electrical frequency, and,
    comparing said electrical frequency to a predetermined set of pressure/frequency data to determine an ambient pressure value.

7. The method of claim 6 wherein said vibration sensing element is a piezoelectric element.

8. An apparatus for determining an ambient pressure comprising:
    a housing comprising an interior volume and further comprising a first ambient pressure inlet port and a second ambient pressure inlet port,
    said interior volume comprising an interior sealing member for sealably partitioning said interior volume to define a first major chamber and a second major chamber,
    said interior sealing member having a vibration sensing element mounted thereon whereby said interior sealing member vibrates in response to vibration generated by said vibration sensing element, said first major chamber comprising a first pressure equalization seal to define a first gas spring chamber and a first external chamber, said first gas chamber in communication with said first external chamber through a first pressure equalization port, said second major chamber comprising a second pressure equalization seal to define a second gas spring chamber and a second external chamber, said second gas chamber in communication with said second external chamber through a second pressure equalization port, a first diaphragm seal disposed within said first exterior chamber to sealably define a first ambient chamber and a first isolation chamber whereby said first diaphragm seal expands or contracts in response to a varying ambient pressure, and, a second diaphragm seal disposed within said second exterior chamber to sealably define a second ambient chamber and a second isolation chamber, whereby said second diaphragm seal expands or contracts in response to a varying ambient pressure.

9. The apparatus of claim 8 wherein said vibration sensing element is a piezoelectric element.

\* \* \* \* \*